United States Patent [19]

Crossland et al.

[11] 4,353,943

[45] Oct. 12, 1982

[54] ALIGNING LIQUID CRYSTAL LAYERS

[75] Inventors: William A. Crossland, Harlow, England; Joseph H. Morrissy, Bietigheim-Bissingen, Fed. Rep. of Germany

[73] Assignee: ITT Industries, Inc., New York, N.Y.

[21] Appl. No.: 291,549

[22] Filed: Aug. 10, 1981

[30] Foreign Application Priority Data

Aug. 18, 1980 [GB] United Kingdom ............... 8026902

[51] Int. Cl.$^3$ .................... B05D 3/12; B05D 3/02; G02F 1/13
[52] U.S. Cl. ........................................ 428/1; 350/341; 427/108; 427/169
[58] Field of Search ................ 427/108, 169; 428/1; 350/341

[56] References Cited

FOREIGN PATENT DOCUMENTS 1505192 3/1978 United Kingdom .
1540838 2/1979 United Kingdom .
1543768 4/1979 United Kingdom .

Primary Examiner—James R. Hoffman
Attorney, Agent, or Firm—John T. O'Halloran; David M. Quinlan

[57] ABSTRACT

In a liquid crystal cell parallel homogeneous alignment of the liquid crystal molecules is provided by rubbing a silica or silica containing film produced by firing a silica containing organic coating applied in liquid form. The alignment provided by this process can withstand firing temperatures in the range 450° to 500° C. normally employed for making fused glass frit perimeter seals. By incorporating titania into the film the refractive index can be matched with that of the underlying electrodes and so render them substantially invisible.

9 Claims, No Drawings

ALIGNING LIQUID CRYSTAL LAYERS

BACKGROUND OF THE INVENTION

This invention relates to liquid crystal display cells and in particular to the provision of molecular alignment layers on the interior major surfaces of the cell walls for promoting parallel homogeneous alignment of the liquid crystal molecules in contact with such layers.

For some years it has been known that parallel homogeneous molecular alignment can be achieved by rubbing a glass sheet with a suitable tissue. It was found that this rubbing left some residue on the glass, probably a grease, and that it was this rubbed residue which provided the alignment. Since then it has been common practice to apply a specific material such as polyvinyl alcohol to the glass, and to rub this to provide the required alignment. This works satisfactorily for cells which are sealed using standard plastic sealing technology, but neither the grease nor materials such as polyvinyl alcohol are able to withstand the sort of temperature required to form the glass frit seals that are required for high reliability devices. Glass frit sealing removes the alignment. One approach to this problem has been to replace the polyvinyl alcohol with a plastic material that can withstand higher temperatures such as polyimide which in suitable circumstances can withstand brief heating to a temperature of around 430° C. This is at the borderline of the temperature range required for glass frit sealing. A typical glass frit seal is fired at around 475° C.

Parallel homogeneous alignment that is fully compatible with glass frit sealing temperatures has previously been achieved by oblique evaporation of a suitable material such as silicon monoxide. The principal drawback of this approach is cost. The process requires quite a good quality vacuum, and requires a relatively large vacuum chamber in order to give an adequate spacing between target and source to minimize the variation in angle of deposition over the surface of the target.

SUMMARY OF THE INVENTION

According to the present invention there is provided a method of providing a liquid crystal parallel homogeneous molecular alignment layer on a glass substrate which method includes the step of applying a uniform thickness coating to the substrate of a solution containing organic compound that will hydrolyze in contact with glass to form an adherent film that can be pyrolyzed to convert the film into a layer consisting of or containing silica, the step of heating the coated substrate sufficient at least to drive off the solvent, the step of rubbing the coated substrate in a particular direction, and, if the heating step was not one that pyrolyzed the film, the step of firing the coated substrate to pyrolyze the film.

The invention thus resides in the discovery that although a typical glass substrate cannot satisfactorily be rubbed to provide a parallel homogeneous molecular alignment layer that will withstand glass frit firing temperature, and neither can a film of silica deposited by conventional chemical vapor reaction, a rubbed film of silica produced by pyrolyzing a layer deposited from the liquid phase is capable of withstanding glass frit firing temperatures without losing its molecular aligning properties.

DETAILED DESCRIPTION OF THE INVENTION

There follows a description of a method, embodying an invention in a preferred form, of providing a molecular alignment layer on a substrate that, together with another substrate and a perimeter seal, is to be used to form a liquid crystal display cell.

A soda-glass substrate typically 2 mm thick is provided with an indium/tin oxide transparent electrode pattern by the conventional method used in liquid crystal device technology. Optionally this electrode may be coated with a thin layer of silica deposited by chemical vapor reaction.

One class of suitable materials from which to form the requisite coating for rubbing is based on a suitable tetra-alkoxysilane, such as tetraethoxysilane. A particular material that may be used is the liquid used in semiconductor technology for forming silica coatings and marketed by Merck under the designation "Liquicoat SI". With this material a fired film thickness in the range 100 to 150 nm has been found suitable since significantly thicker films are liable to become crazed on firing. A coating of appropriate thickness can be obtained for instance by spinning; the method chosen in this particular instance is however dip coating. The substrate is lowered vertically on edge into the liquid at a controlled rate and then withdrawn from it again, also at a controlled rate. It was found that a coating of appropriate thickness was obtained using a withdrawal rate of about 10 cm per minute with a mixture of 60 parts by volume of the Liquicoat SI solution together with 40 parts of the thinners supplied for diluting the Liquicoat SI. Optionally the coating is subjected to preliminary drying as it is withdrawn from solution by directing a beam of light on to it from a projector lamp.

Initially some problems were encountered regarding uneven wetting of the glass substrate by the solution. These problems were attributed to the presence of moisture and were remedied by baking the substrates at 250° C. for an hour, cooling them in dry nitrogen to room temperature, and immersing them in the solution immediately after they were cool.

Normally a region of the electroded substrate will need to be uncoated in order to be able to make direct electrical connection with the or each electrode. This can readily be achieved using conventional masking tape.

Once the substrate has been withdrawn from the solution it has to be heated to drive off the solvent, hydrolyze the coating and then pyrolyze it. Typically the solvent may be driven off by heating for about 15 minutes at between 50° and 80° C. This leaves a relatively soft film which is hardened by further heating. The further heating may be in two stages with a preliminary heating typically at between 200° and 250° C., followed by a final firing typically at between 450° and 500° C. Alternatively the further heating may involve a single stage heating involving firing at a temperature within the higher range.

At some stage in the processing the coated substrate needs to be rubbed to provide it with the required molecular alignment properties. This may be done while the coating is still relatively soft after having had its solvent driven off, or it may be done after the preliminary heating of the hardening treatment, or it may be done after final firing at the high temperature.

In a particular example in which rubbing was performed after firing at 475° C. it was found that alignment of acceptable quality was obtained using a velvet-like texture cloth covered squeegee in the form of hard rubber blade. Between 2 and 10, and typically 5, strokes of the squeegee were required using a cloth marketed under the Registered Trade Mark SELVYT, and a force designed, having regard to the area of contact, to produce a pressure in the range 70 to 140 kilopascals (1 pascal=1 newton per square meter). After every few strokes of the squeegee it is desirable to index the cloth so that a fresh portion is used for rubbing, and in this way minimize the risk of gross scoring of the surface through the pick-up of contaminating particles.

In another example, which also involved rubbing after firing at 475° C., the rubbing was effected by using a brush type 15 cm diameter polishing wheel with bristles about 4 cm long. This was rotated at about 3,000 revolutions per minute to provide a measure of "stiffness" to the bristles, having regard to the hardness of the fired film. It was found that alignment of acceptable quality was produced by passing the substrate under the wheel typically between 10 and 20 times.

The rubbed substrates are in each case then ready for assembly with other such rubbed substrates, or substrates provided with molecular alignment by some other means, to form a liquid crystal cell whose perimeter seal is formed by a fused glass frit seal fired at a temperature typically in the range 450° to 500° C. Such a cell is filled with its liquid crystal medium in the conventional manner by evacuating the cell and back filtering it through an aperture either formed in one of the substrates or formed by an interruption in the ribbon of glass frit forming the perimeter seal.

A feature of molecular alignment layers formed in this way, compared with those formed by oblique evaporation is that this method provides an alignment in the rubbing direction with a small near-optimum tilt angle out of the plane of the layer. In contrast, a simple single oblique evaporation either produces molecular alignment with no tilt angle or one with a relatively large tilt angle. The absence of a tilt angle is undesirable in display devices because it is liable to produce randomly shaped regions of visually distinguishable texture due to the effects of reverse tilt. These effects are removed by the presence of a tilt angle, but if the tilt angle is too large it has a marked deleterious effect upon the viewing angle and switching speed and threshold of the cell. The avoidance of these problems of excessive tilt angle makes it easier to produce acceptable multiplexed devices, and, in the case of relatively large area cells, there is the added advantage that this method of alignment avoids the problem of the oblique evaporation associated with the fact that the alignment properties are a function of position on the surface of the substrate by virtue of the fact that the angle of deposition is a function of position.

A further advantage of the method of the present invention is that by suitable admixture of components in the coating solution it is possible to alter the refractive index of the fully fired film, and in particular to adjust it so that it substantially matches that of the material of the transparent electrodes. If such a coating is provided directly on the electroded substrate, with no intervening layer between the electrodes and the coating, a substantial match of their refractive indices will eliminate or at least reduce the entirely unwanted visibility of the electrode pattern.

Thus to the Liquicoat SI solution may be added an appropriate quantity of the related solution marketed by Merck under the designation Liquicoat TI. It has been found that a suitable mix comprises 24 parts by volume Liquicoat TI, 47 parts Liquicoat SI, and 29 parts thinners. In all other respects the processing using this mixture proceeded as previously described with reference to the solution consisting solely of Liquicoat SI and thinners.

The invention has been described by reference to a specific embodiment. Those skilled in the art will recognize that modifications other than those specifically mentioned can be made without departing from the spirit of the invention and the scope of the present invention is defined solely by the appended claims.

We claim:

1. A method of providing a liquid crystal parallel homogeneous molecular alignment layer on a glass substrate which method comprises:
   applying a uniform thickness coating to the substrate of a solution containing organic compound that will hydrolyze in contact with glass to form an adherent film that can be pyrolyzed to convert the film into a layer consisting of or containing silica;
   heating the coated substrate sufficient at least to drive off the solvent;
   rubbing the coated substrate in a particular direction; and
   firing the coated substrate to pyrolyze the film.

2. A method as claimed in claim 1 wherein the solution contains a mixture of organic compounds in such proportions that the refractive index of the pyrolyzed film is substantially matched with that of one or more transparent electrodes deposited upon the substrate prior to the provision of the molecular alignment layer.

3. A method as claimed in claim 2 wherein the said one or more transparent electrodes are made of indium/tin oxide and wherein said solution contains one or more silicon containing organic compounds admixed with one or more titanium containing organic compounds.

4. A method as claimed in claim 1 wherein said heating step fires the coated substrate to pyrolyze the film.

5. A method as claimed in claim 1 wherein a constituent of said solution is tetraethoxysilane.

6. A method as claimed in claim 1, 2, 3, 4 or 5 wherein the step of rubbing the coated substrate is performed with a cloth.

7. A method as claimed in claim 1, 2, 3, 4 or 5 wherein the step of rubbing is performed with a brush type polishing wheel.

8. A glass substrate provided with a liquid crystal parallel homogeneous molecular alignment layer by the method claimed in claim 1.

9. A liquid crystal cell having a layer of liquid crystal medium contained in an envelope formed by two sheets and a fused glass frit perimeter seal wherein at least one of said sheets is a glass substrate as claimed in claim 8.

* * * * *